United States Patent
Wells et al.

[11] Patent Number: 6,022,620
[45] Date of Patent: Feb. 8, 2000

[54] OPTICAL FIBRE ASSEMBLIES AND DUCTS THEREFOR

[75] Inventors: Jonathan Paul Wells, Flintshire; Aidan Patrick Joseph Cadden; Beverley Anne Brown, both of Chester, all of United Kingdom

[73] Assignees: BICC PLC, London; an undivided one-half interest; Corning Limited, Sunderland, both of United Kingdom; an undivided one half-interest

[21] Appl. No.: 08/676,097

[22] Filed: Jul. 2, 1996

[30] Foreign Application Priority Data

Jul. 4, 1995 [GB] United Kingdom .................... 9513569

[51] Int. Cl.[7] .............................. D02G 3/00; G02B 6/44; G02B 6/02
[52] U.S. Cl. ..................... 428/375; 428/378; 428/392; 428/394; 385/100; 385/128
[58] Field of Search ..................... 428/375, 392, 428/378, 394; 385/128, 100, 102

[56] References Cited

U.S. PATENT DOCUMENTS

| | | |
|---|---|---|
| 4,427,823 | 1/1984 | Inagaki et al. |
| 4,952,021 | 8/1990 | Oaki et al. .......................... 350/96.23 |
| 5,179,171 | 1/1993 | Minami et al. ......................... 525/288 |

FOREIGN PATENT DOCUMENTS

| | | | |
|---|---|---|---|
| 0 157 610 A2 | 10/1985 | European Pat. Off. | .......... G02B 6/44 |
| 0 345 968 A2 | 12/1989 | European Pat. Off. | ........ C03C 25/02 |
| 0 373 633 A2 | 12/1989 | European Pat. Off. | ........ C08G 65/40 |
| 0 454 405 A2 | 10/1991 | European Pat. Off. | .......... G02B 6/44 |
| 60-026910 | 2/1985 | Japan | ................ G02B 6/44 |
| 4056905 | 6/1990 | Japan | ................ G02B 6/00 |
| 5188224 | 7/1993 | Japan | ................ G02B 6/00 |
| 2156837 | 10/1985 | United Kingdom | ............ C08L 23/06 |

*Primary Examiner*—William Krynski
*Assistant Examiner*—J. M. Gray
*Attorney, Agent, or Firm*—Darby & Darby

[57] ABSTRACT

An optical fiber assembly is described exhibiting antistatic behavior comprising at least one optical fibre and having an external organic polymer-based coating which contains a non-aqueous, or substantially non-aqueous, antistatic composition comprising (a) an antistatic agent(s), and (b) an organic liquid(s) having a dielectric constant of $\geq 15$ and a boiling point of $\geq 100°$ C.

20 Claims, 2 Drawing Sheets

OPTICAL FIBRE ASSEMBLIES AND DUCTS THEREFOR

TECHNICAL FIELD

The present invention relates to optical fibre assemblies suitable for installation in or removal from the ducts of optical fibre transmission lines by blowing with a pressurised gas, to ducts for carrying optical fibre assemblies, and to combinations of optical fibre assemblies and ducts therefor.

BACKGROUND OF THE INVENTION

Optical fibres are widely used in the communications field because of their ability to carry large amounts of information over long distances. In order to protect the fibres from physical damage during installation and also from subsequent deterioration due to environmental agencies, it is conventional to apply protective coatings to the freshly drawn fibres as an integral part of the production process.

Because of the difficulty of achieving all the required physical properties in a single coating, optical fibres are frequently provided with at least two coatings (normally organic polymer-based) a soft (primary) buffer coating, nearest to (usually contacting) the optical fibre, having an ability to compensate (inter alia) for the effects of differential thermal expansion, and a secondary high modulus coating, providing (inter alia) the necessary toughness and resistance to chemical attack. Such a coated optical fibre may also have one or more further coatings in addition to the primary (buffering) and secondary high modulus coatings to ameliorate still further the properties of the protective coating as a whole; such further coatings may be outer to or inside the secondary high modulus coating. It is also possible that an effective protective coating might be achieved with a single coating, particularly as the technology advances, which then serves as the coating providing toughness and chemical resistance as well as a buffering layer.

Coated optical fibres, in whatever structural variation, are herein termed optical fibre assemblies; such assemblies may, for example, contain a single buffered fibre (normally with at least one further coating), a plurality of fibres encapsulated in a common buffer coating (usually with at least one further coating), or a bundle of bare or coated fibres loosely contained or firmly held within a polymeric sheath.

The hitherto normal method of installation of optical fibre assemblies involves pulling the assembly along previously laid cable ducts with the aid of ropes, and to avoid damage to the assemblies, it is necessary to overjacket them with an expensive cable system.

In order to avoid these problems, it has been proposed in EP-A-0108590 to propel the fibre assembly along a tubular pathway, provided by a duct of a transmission line, by the fluid drag of a pressurised gaseous medium (normally air) passed through the pathway in the desired direction of advance. In other words, the optical fibre assemblies are blown into place on a cushion of air. Using this technique it is proposed to "blow" optical fibres along ducts for long distances without damage. It has also been proposed to withdraw the fibre assemblies from transmission lines by the same kind of technique. A single transmission line can have a single duct therein or can have plurality of such ducts therein, each of which may carry, as has the potential for carrying, an optical fibre assembly.

In order to achieve an effectively blowable optical fibre assembly, various design features therefor have been proposed in the prior art.

For example, in EP-A-157610 an optical fibre assembly is described in which optical fibres are surrounded by an inner sheath and in turn an outer layer of lower density, typically foamed polyethylene, to improve blowability. U.S. Pat. No. 4,952,021 similarly incorporates a foamed outer layer in an optical fibre assembly to improve blowability. EP-A-345968, on the other hand, incorporates particles such as hollow glass or polymeric microspheres in the external coating of an optical fibre assembly in order to achieve reduced density. This publication also teaches incorporating particles such as hollow microspheres or polytetrafluoroethylene (PTFE) particles into the external coating of a size, relative to the coating thickness, such that the surface of the coating is provided with indentations and/or protuberances; the resulting surface roughness of the external coating provides a more effectively blowable system.

In GB-A-2156837 and U.S. Pat. No. 4,952,021 there are described optical fibre assemblies in which the external coating of the optical fibre assembly, and/or the duct through which it passes, carries a friction or adherence-reducing substance such as an antistatic agent, a slip or lubricating material, or an antiblock agent. Combinations of such materials are also contemplated in these teachings.

In our experience, the build-up of a static electric potential between the optical fibre assembly and the duct, caused by the frequent contacting of the fibre assembly and the duct wall as the fibre assembly passes through the duct, is an especially troublesome feature which inhibits effective blowability of the optical fibre assembly, and it is therefore highly desirable that any accumulation of static charge on the fibre assembly (and duct) should be eliminated as soon as possible after its formation. This formation of accumulated static charge is particularly a problem in the case of optical fibre assemblies which carry an external coating based on a radiation-cured urethane-acrylate resin which, while an excellent material for the purpose, does tend to accumulate static charge to a greater extent in comparison to coatings such as foamed polyethylene and moreover tends, unaided, to dissipate this charge more slowly in comparison to certain other known external coating materials such as ethylene/vinyl acetate copolymers. It is nevertheless desirable to dissipate as soon as possible accumulated static charges formed in any type of optical fibre assembly, and for this purpose it is known, as mentioned above, to incorporate an antistatic agent in the external coating of the optical fibre assembly and/or in the duct material (as described e.g. in GB-A-2156837 and U.S. Pat. No. 4,952,021). The antistatic agent in an external coating of an optical fibre assembly is believed to exert its charge dissipating effect by migration (blooming) to the surface of the coating (and similarly for the duct material if it too carries an antistatic agent) and there causing an increase in surface conductivity (and hence more ready dissipation of static charge). (For example, it is considered by many of those skilled in the art that antistatic behaviour corresponds to a surface resistivity of $\leq 10^{-}$ohm/square). We do not, however, wish to be bound by this theory of the mechanism for effecting the dissipation of static charge. Moreover, whatever the precise mechanism, substances which can act to dissipate static charges are extremely well known in the literature and to those skilled in the art and are conventionally called antistatic agents (with the resulting effect being known as antistatic behaviour) a term which we will use herein irrespective of the precise mechanism of charge dissipation.

Antistatic agents, or compositions containing antistatic agents, are well known in the art as mentioned above (many being available commercially) and can be incorporated into optical fibre assemblies (and/or ducts) for the purpose discussed above. Some of these are aqueous dispersions of antistatic agents such as quaternary ammonium compounds. However, there can be difficulties associated with formulating such aqueous dispersions into compositions to be used for optical fibre coating; e.g. they may give rise to globule formation, settlement and general inhomogeneity in the finally formulated composition. In the case of commercially available antistatic agents, or compositions containing them, which do not incorporate water to any (or any substantial) extent, most are only effective if the moisture content of the gas used for blowing (usually air) is quite high. Indeed many water-lacking antistatic agents, or compositions containing them, including those available commercially, are not properly effective unless the relative humidity level of the atmosphere is $\geq 30\%$ (at ambient temperature and pressure). However, the presence of such high levels of moisture in the pressurising gas can be undesirable because water can condense and hence collect at the launch end of the duct (because of the high pressure), and also in the cooler regions of the duct, and this can result in difficulties in blowing the fibre through the wet duct. It is also operationally easier not to have to wet the air to achieve high levels of moisture.

It would therefore be most desirable for an antistatic agent, in the context discussed above, which does not incorporate water to any (or any substantial) extent, to be properly effective at low levels of moisture in the gas used for blowing, e.g. at 0 to 8% relative humidity (at ambient temperature and pressure), as well as at higher levels of up to 30% or more relative humidity. In other words, it would be most desirable if the effectiveness of the antistatic agent were substantially independent of the level of relative humidity and could be used without detriment at any moisture level in the pressurised gas, particularly at very low levels of moisture.

In addition to this desiteratum, it would also be advantageous if this moisture-independent antistatic effect did not deteriorate on ageing, even at elevated temperatures, since optical fibres, once installed, will tend to be left for many years.

SUMMARY OF THE INVENTION

We have now identified how to achieve these desirable advantages discussed above.

According to the present invention there is provided an optical fibre assembly exhibiting antistatic behaviour comprising at least one optical fibre and having an external organic polymer-based coating which contains a non-aqueous, or substantially non-aqueous, antistatic composition comprising (a) an antistatic agent(s), and (b) an organic liquid(s) having a dielectric constant of $\geq 15$ and a boiling point of $\geq 100°$ C.

There is also provided according to the invention an organic polymer-based coating material exhibiting antistatic behaviour suitable for use as the external coating of an optical fibre assembly, wherein said coating material contains an antistatic composition as defined above.

In further embodiments of the invention, the defined antistatic composition is incorporated into at least the inner region of the duct which carries the optical fibre assembly, or in both the external coating of the optical fibre assembly and the inner region of the duct.

There is therefore further provided according to the invention a duct of an optical fibre transmission line for carrying an optical fibre assembly and having an inner region which defines a tubular pathway for the optical fibre assembly, wherein said duct exhibits antistatic behaviour and has incorporated into at least the inner region thereof an antistatic composition as defined above.

There is yet further provided according to the invention the combination of an optical fibre assembly and a duct therefor exhibiting antistatic behaviour, either or both of said assembly and duct incorporating an antistatic composition as defined above, the antistatic composition being located in the optical fibre assembly and/or the duct also as defined above.

DETAILED DESCRIPTION

Figure 1:
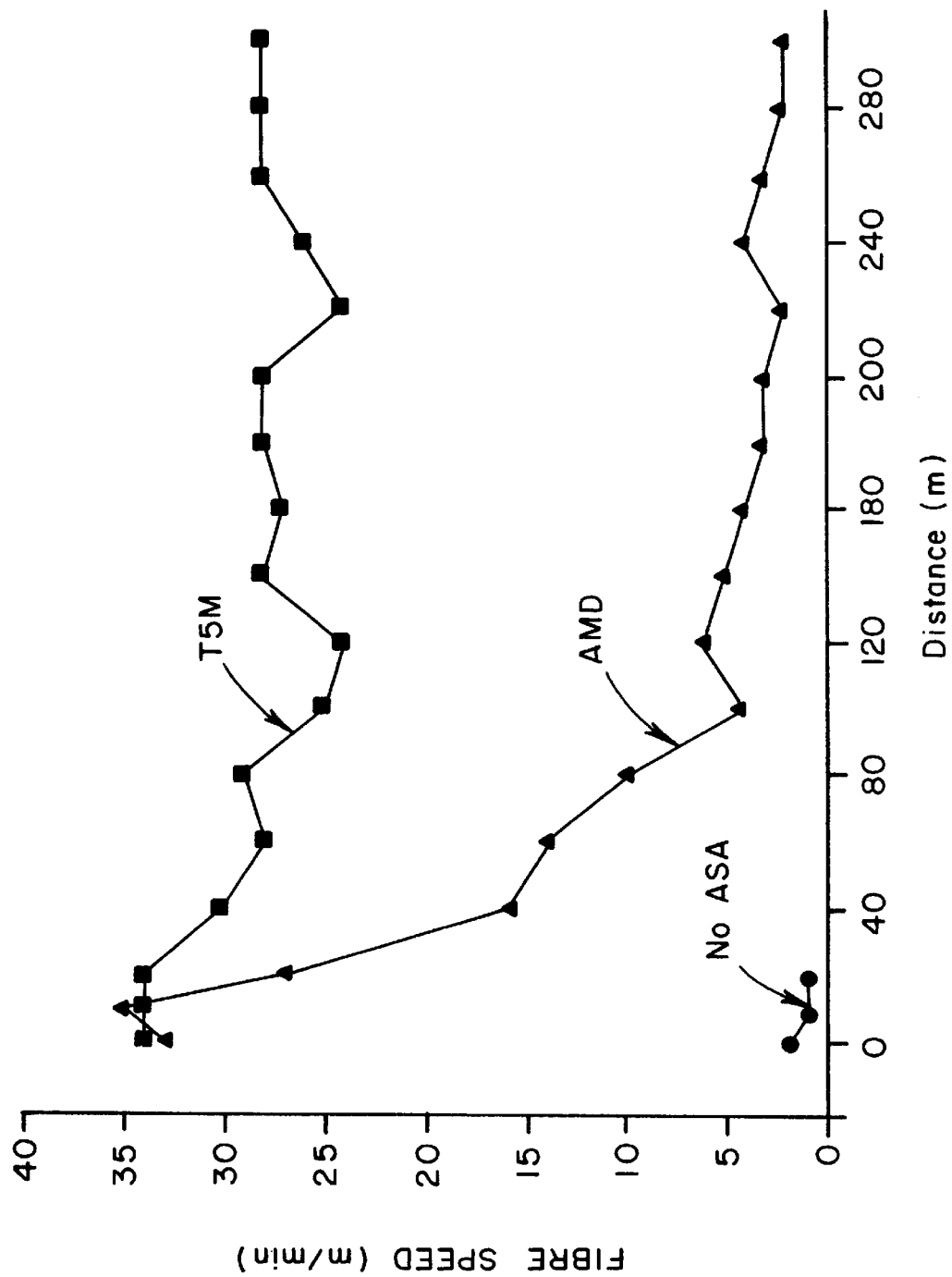

We have thus found that the incorporation of the antistatic composition, as defined above, into the external coating of an optical fibre assembly for installation in or withdrawal from a duct of an optical fibre transmission line by blowing with a pressurised gas, and/or into the duct, allows an effective antistatic action to be exerted which is substantially independent of the level of moisture in the pressurising gas, and in particular achieves an effective antistatic action at very low levels of moisture. Nor does this antistatic action deteriorate an ageing at an elevated temperature.

References herein to values of dielectric constants relate to those values measured at or near to ambient temperatures (usually 20° C. or 25° C.; slight variation in temperature around ambient usually has only a small effect on the value) and at normal atmospheric pressure (760 mm Hg; again slight variations in pressure around atmospheric having little effect on the value), and are intended to be those values corresponding to the limiting values at low frequencies (the so-called static values). References to values of boiling points (in connection with component (b)) relate to those values measured at normal atmospheric pressures (760 mm Hg).

References to component (b) as a liquid(s), relate to a material(s) that is a liquid at ambient temperature or slightly above. Usually such a material will have a melting point below 20° C., but sometimes a material of melting point up to about 40° C. may suffice.

Effective antistatic agents for use as component (a) of the antistatic composition may be readily selected from commercially available products; examples of these types include quaternary ammonium compounds, amine compounds, polyglycol compounds (such as polyethoxy compounds), amino-polyglycol ether compounds, fatty alcohol derivatives, and phosphate esters.

The organic liquid of component (b), in addition to possessing its high dielectric constant and high boiling point properties, may possibly exert a solvent or dispersant action on the antistatic agent of the antistatic composition. This is not to say it will necessarily provide a true solution or dispersion of the antistatic agent in the actual composition which is used for the invention (although it may do so), since its level in the composition will often be quite small compared to that of the antistatic agent (usually only up to a few percent thereof-see later). Rather, it may possibly (because of this perceived solvent or dispersant action) render the antistatic agent relatively more mobile in the external coating, particularly at the surface region of the coating.

The dielectric constant of the organic liquid of component (b) is preferably $\geq 20$, more preferably $\geq 25$. Usually, the dielectric constant will not be greater than 80.

The boiling point of the organic liquid of component (b) is preferably $\geq 100°$ C., more preferably $\geq 150°$ C. Usually, the boiling point will not be greater than 300° C. Mixture of such liquids may also be used of course to provide the component (b).

Useful organic liquids for use as component (b) are certain of the liquid polyhydric alcohols, particularly certain of the liquid glycols, since these are invariably high boiling and often possess high dielectric constant. Examples of these include the following:

|  | Dielectric Constant | Boiling Point |
| --- | --- | --- |
| ethylene glycol | 39 | 197° C. |
| 1,2 - propane diol | 32 | 187° C. |
| 1,3 - propane diol | 35 | 214° C. |
| 2,4 - pentane diol | 27 | 199° C. |
| 2-methyl-2,4-pentane diol | 26.5 | 198° C. |
| glycerol | 42.5 | 290° C. |

Other possibly useful liquids for us as component (b) are propylene carbonate (i.e. 1,2 -propane diol cyclic carbonate), having dielectric constant of 64 and boiling point of 240° C., and ethylene carbonate (i.e. 1,3 -dioxan-2-one) having dielectric constant of 89 and boiling point 243° C. (152° C. at 740 mm Hg).

The antistatic agent composition may, if desired, also include other components, such as an organic liquid(s) other than as defined for (b). If used, this might also usefully have a solvent or dispersant action on the antistatic agent. Examples of such liquids are those of high dielectric constant but of low boiling point, such as methanol (dielectric constant 33; boiling point 66° C.) or ethanol (dielectric constant 24; boiling point 78° C.).

The relative levels of components (a) and (b) in the antistatic composition may vary over a fairly wide range and are not particularly critical. Generally speaking, however, the antistatic composition will often contain the following levels of (a) and (b) (on a weight % basis of (a) plus (b)):

(a) 50 to 99.5%, more preferably 90 to 99.5%
(b) 0.5 to 50%, more preferably 0.5 to 10.0[{]ps The level of the antistatic composition as a whole in the external coating of the optical fibre assembly (and/or the duct of the optical transmission line) should be at least sufficient to provide an effective antistatic action. The minimum level for acceptable activity may vary according to the particular nature of the external coating material (and/or duct) and/or the particular nature of the antistatic agent and so is not exactly predictable. It may, however, readily be determined by experiment for any given system. Even so, we have generally found that a level of about $\geq 1.5\%$ w/w of the antistatic composition in an external fibre coating will provide an extremely effective antistatic action, with levels below 1.5% w/w often achieving an ineffective antistatic effect. The upper limit for the level of antistatic composition in the external coating is not particularly critical; also we have found that increasing the level to much above the minimum for achieving a good antistatic effect may not necessarily provide much further enhancement of antistatic behaviour. For practical purposes the upper level is usually about 20% w/w of the external coating. A typical range for the level of antistatic composition in the coating is therefore about 1.5 to 20% w/w, usually about 2.0 to 10%

As mentioned above, the optical fibre assembly may contain a single buffered fibre, a plurality of fibres encapulated in a common buffer coating, or a sheathed bundle of fibres.

An optical transmission line may comprise a single duct, or, more usually, a plurality of such ducts (e.g. 4 to 8 ducts).

The organic polymer providing the external coating is preferably a polymer which has been formed by the radiation curing of a radiation-curable coating composition and which has appropriate properties for the purpose intended. Such a coating composition is, in particular, based on a polyethylenically unsaturated oligomer-especially a urethane-acrylate resin.

Radiation-curable coating compositions are well known in the art and typically comprise:

(i) a polyethylenically unsaturated oligomer,
(ii) an ethylenically unsaturated monomer which is a liquid solvent for the oligomer and is copolymerisable therewith, and
(iii) a photoinitiator composition.

Examples of polyethylenically unsaturated oligomers which may be present in the radiation-curable coating compositions include unsaturated polyester resins, epoxy-acrylate resins and, especially, urethane-acrylate resins. Typical urethane-acrylate resins include reaction products of a polyol (for example a polyether polyol) an organic polyisocyanate (for example isophorone diisocyanate) and an ethylenically unsaturated monomer containing a single hydroxyl group (for example a hydroxyalkyl acrylate or methacrylate), the ratio of NCO groups in the polyisocyanate to OH groups in the polyol being greater than 1:1 and the ratio of total OH groups to NCO groups being at least 1:1.

Examples of ethlenically unsaturated monomers which may be present in the radiation-curable coating compositions are well known in the art and include esters of acrylic and methacrylic acids such as methly methacrylate, isobornyl acrylate, phenoxyethyl acrylate, ethoxyethoxyethyl acrylate, butoxyethyl acrylate and butyl acrylate, acrylonitrile, methacrylonitrile, styrene, vinyl acetate and N-vinylpyrrolidone. It is often advantageous to include polyfunctional acrylate monomers such as ethylene glycol diacrylate or trimethyolopropane triacrylate.

The relative proportions of polyethylenically unsaturated oligomer and ethylenically unsaturated monomer in the radiation-curable coating compositions will depend upon the required viscosity of the compositions and the required properties of the cured product. Typical compositions contain 5 to 45, especially 10 to 30, parts by weight of unsaturated monomer per 100 parts by weight of oligomer and monomer.

The photoinitiator composition present in the radiation-curable coating compositions may absorb visible or ultra-violet radiation. The photoinitiator composition may comprise, as the radiation-absorbing component thereof, conventional agents such as benzophenone and derivatives thereof, acetophenone and derivatives thereof, benzoin, benzil and benzil acetals. These photoinitiators may be used singly or in mixtures and are usually present in amounts of up to about 10% of the curable coating composition on a weight basis, especially from 2 to 6%. Amine accelerators such as methyldiethanolamine or diethylaminoethyl benzoate or polythiols may be included to enhance the cure. (It is also conceivable that the photo initiator composition could be omitted if the curing radiation employed were electron beam radiation).

In one particular advantageous embodiment of the invention, the external coating also contains particular matter, such as glass microspheres or polymer (e.g. polytetrafluoroethylene) particles, of such a size as to cause indentations and/or protuberances in the surface of the external coating. This follows the teaching of EP 0345968 and provides surface roughness which improves blowability. Generally speaking, the level of such particles in the external coating is that to provide a coating which contains from 1 to 40%, preferably from 5 to 30%, by volume of particulate matter.

The external coating may contain other, more conventional ingredients, e.g. flatting agents, slip agents, pigments or dyes, and stabilizers.

A radiation-curable coating composition, also containing the antistatic composition (as defined) and any other ingredients (such as particulate material) may be applied to the optical fibre(s) (usually already precoated with one or more intermediate coatings) by any conventional method. Preferably, a precoated optical fibre or bundle of such fibres is drawn through a bath containing the coating composition at a rate of about 1 to about 10 metres per second to give a coating of between 10 and 100 microns. Thereafter, the coating composition is subjected to electromagnetic irradiation (e.g. ultra violet irradiation) to cure the coating.

The optical fibres themselves may be singlemode or multimode and may be conventional silica glass fibres, polymer clad silica fibres and polymer core fibres. Usually, they are conventional silica glass fibres.

As mentioned above, the optical fibre assembly of the invention usually includes at least a soft (inner) buffer coating and a hard (high modulus) secondary coating. While it is conceivable that the external coating containing the antistatic composition could also serve as the high modulus secondary coating, it is usually a further coating applied after the application of the soft inner coating and the secondary high modulus coating. Usually it is of high modulus but could be of low or intermediate modulus. It is also useful for the optical fibre assemble to include a further soft buffering layer of low modulus in addition to the innermost buffer coating, the secondary hard coating and the external coating (containing antistatic agent). This could e.g. be applied over the hard secondary layer of high modulus and be situated below the external coating (which would then be a quaternary coating). Such a further additional buffer coating, underlying the external coating, would act to further minimise the stress on the waveguide core and could comprise e.g. a soft radiation-cured polymer which could be similar to that used for the innermost buffer coating (although it does not of course have to be). Indeed, all coatings used for the optical fibre assembly can be radiation-cured polymer coatings, particularly those based on urethane-acrylate oligomers (discussed above); it is nevertheless possible to use other types of polymer coating for one or more (or all) or the coatings in the optical fibre assembly.

The antistatic compositions for use in the invention may be prepared by admixing the antistatic agent and the high dielectric constant, high boiling, organic liquid (and other component(s), such as low boiling, high dielectric constant liquid like methanol, if used). It may, however, be possible to use a commercially available antistatic preparation which is already (as sold) in the form of an antistatic composition as defined above. For example, we have found that the commercially available antistatic preparation SANDOQUAD T5M (Sandoz Chemicals) will serve, as sold, as the antistatic composition for use in the invention. This is said to contain, as the antistatic agent, fatty amine polyglycol ether ($\geq$95% by weight of the composition) with the remainder being 2-methyl-2,4-pentanediol. Nevertheless, this is the only commercial material thus far (amongst the great number available) that we know of which will, as sold, serve as the antistatic composition of the invention.

The organic polymer-based composition used for preparing the external coating may be prepared by admixture of all the ingredients used therein prior to applying to an optical fibre; for example the organic polymer or organic precursor system (e.g. a radiation-curable composition based, in particular on a urethane-acrylate resin as discussed above), the antistatic composition (if not soley incorporated into the duct), and other ingredients, if used, such as particulate matter. As discussed above, when the coating composition is radiation-curable, the fibre (usually precoated) is conventionally drawn through a bath containing the coating composition and the coated fibre then subjected to electromagnetic irradiation (e.g. uv-irradiation) to cure the coating.

The invention is now illustrated by reference to but not limited by the following examples.

EXAMPLES 1 TO 7

The potential performance of a series of coating materials containing different commercially available antistatic compositions or antistatic agents was evaluated at different relative humidities. The coating material in each case was based on a radiation-cured urethane-acrylate oligomer composition of the type described herein, and suitable for the external coating of an optical fibre, and measurements were taken on cast films of the coating materials. (A coating material with no antistatic material therein was also evaluated as a control).

The measurements taken were the surface resistivities of the films (using an electrometer), carried out in a controlled humidity chamber (where the humidity could be varied). All measurements were made at 25° C. and ambient pressure. It is generally accepted in the art that antistatic behaviour corresponds to a surface resistivity of $\leq$10 ohm/square.

In these tests, the following commercially available antistatic materials were used.

|  | Composition* | Abbreviation |
| --- | --- | --- |
| 'ELFUGIN' AKT | phosphate ester in mainly aqueous solution | AKT |
| 'ELFUGIN' V | fatty alcohol derivative, amphoteric in aqueous solution | V |
| 'SANDOQUAD' T5M | fatty amine polyglycol ether ($\geq$95% w/w) containing 2-methyl-2,4-pentane diol ($\leq$5% w/w) | T5M |
| 'SANDOLEC' AMD | quaternary ammonium compound containing a small amount of methanol | AMD |

*(Information provided is as stated in the manufacturers data sheet or, in the case of AMD, as could be determined by analysis.)

In addition, an antistatic composition based on 'Sandolec' AMD except that it additionally contained 5% w/w of propylene carbonate was also used; this is abbreviated to AMD/C.

The results are shown in the following Table 1.

TABLE 1

| Ex. No. | Film Thickness micron | Antistat Used | Level in film % w/w | Surface Resistivity (ohms/square) | | | |
|---|---|---|---|---|---|---|---|
| | | | | 8% Rel. Hum. | 20% Rel. Hum. | 30% Rel. Hum | 40% Rel. Hum. |
| 1 | 50 | none | — | $10^{19.60}$ | $10^{19.60}$ | $10^{19.60}$ | $10^{19.6}$ |
| 2 | 50 | AKT | 1.9 | $10^{19.60}$ | $10^{19.60}$ | $10^{12.83}$ | $10^{11.57}$ |
| 3 | 60 | AKT | 5.6 | $10^{19.60}$ | $10^{19.60}$ | $10^{12.05}$ | $10^{10.63}$ |
| 4 | 55 | C | 4.8 | $10^{12.75}$ | $10^{12.05}$ | $10^{11.37}$ | $10^{10.85}$ |
| 5 | 50 | T5M | 4.8 | $10^{10.40}$ | $10^{10.05}$ | $10^{9.80}$ | $10^{9.5}$ |
| 6 | 58 | AMD | 4.8 | $10^{14.25}$ | $10^{11.35}$ | $10^{11.00}$ | $10^{10.00}$ |
| 7 | 50 | AMD/C | 5.0 | $10^{11.20}$ | $10^{10.15}$ | $10^{9.50}$ | $10^{9.00}$ |

It will be observed that the coating materials of Examples 5 and 7, incorporating T5M and AMD/C respectively, which were according to the invention, exhibited excellent antistatic behaviour at both high and low levels of relative humidity. By comparison, the coating materials of Examples 2, 3 and 6 did not exhibit acceptable antistatic behaviour at low levels of relative humidity. In the case of the coating material of Example 4 (also not according to the invention), this did exhibit acceptable antistatic behaviour (although inferior to that of Example 5) —but of course contained water as a component of the incorporated antistatic composition.

EXAMPLES 8 To 17

These examples (nos. 8 to 13) illustrate the effect on antistatic behaviour of varying the level of the antistatic composition T5M in the coating film material (using the same polymer material as in the previous examples), different humidities being employed. For comparison, the effect of varying the level of AMD is also shown (Examples 14 to 17). All measurements were carried out at 25° C. and ambient pressure. The results are shown in the following Table 2.

TABLE 2

| Ex. No. | Antistat Used | Level in film % w/w | SR at 11% Rel. Hum. log (ohm/ square) | SR at 7% Rel. Hum. log (ohm/ square) | SR at 1–3% Rel. Hum. log (ohm/ square) |
|---|---|---|---|---|---|
| 8 | T5M | 1.0 | 22.00 | 22.00 | 22.00 |
| 9 | T5M | 2.0 | 11.33 | 11.60 | 11.80 |
| 10 | T5M | 3.0 | 11.00 | 11.00 | 11.30 |
| 11 | TSM | 4.0 | 11.00 | 11.32 | 11.62 |
| 12 | T5M | 5.0 | 10.40 | 10.60 | 10.90 |
| 13 | T5M | 18.0 | 10.00 | 10.00 | 10.50 |
| 14 | AMD | 2.0 | 22.00 | 22.00 | 22.00 |
| 15 | AMD | 3.0 | 14.00 | 13.11 | 13.44 |
| 16 | AMD | 4.0 | 12.00 | 12.00 | 13.81 |
| 17 | AMD | 5.0 | 11.61 | 12.05 | 13.80 |

It will be observed that a level of 1% w/w of T5M in the coating material did not produce a beneficial effect on antistatic behaviour, while levels of 2.0% w/w and above yield coating materials of excellent antistatic behaviour-even at very low relative humidities of 1–3%. It is also seen that levels of above 2% w/w T5M did not produce a significant further improvement of antistatic behaviour.

By contrast, the incorporation of AMD at levels of 2% w/w or above did not yield acceptable antistatic behaviour at 1–3% relative humidity levels.

EXAMPLES 18 TO 21

Then examples illustrate any effect on antistatic behaviour of ageing, at elevated temperatures, coating compositions (based on the same polymer as in previous examples) containing 5% w/w of T5M, different humidities being employed. After ageing, all measurements were carried out at 25° C. as in Examples 8 to 17.

The results are shown in Table 3.

TABLE 3

| Ex. No. | Temp of Ageing ° C. | Time of Ageing Days | SR at 11% Rel. Hum. log (ohm/ square) | SR at 7% Rel. Hum. log (ohm/ square) | SR at 1–3% Rel. Hum. log (ohm/ square) |
|---|---|---|---|---|---|
| 18 | 65 | 7 | 10.25 | 10.35 | 10.50 |
| 19 | 65 | 40 | 10.50 | 10.40 | 10.50 |
| 20 | 85 | 7 | 10.42 | 11.00 | 11.56 |
| 21 | 85 | 40 | 11.00 | 12.5 | 11.90 |

As can be seen, it was found that ageing at an elevated temperature had relatively little effect on the good antistatic behaviour of the coating materials according to inventions.

The effect on the installation by blowing of an acrylate coated optical fibre, of the presence of an additive according to the invention, was demonstrated by the following experiment. In this experiment a coated fibre was installed in a duct and then blown out of the duct, or at least this was attempted, for three different coated fibres. Each consisted of a single, glass optical fibre having a diameter of 125 microns, coated with conventional coatings, to give a coated fibre having a diameter of 250 microns, over which was applied a soft coating having an external diameter of 460 microns and finally a harder outer coating containing particles of PTFE (polytetrafluoroethylene tetraphalte) to give a final diameter of 485 microns. For further details of suitable soft and harder coatings, attention is directed to EP-A-157610 referred to above. For further details of particle-containing coatings, attention is directed to EP-A-345968, also referred to above.

The three fibres differed in their outer coatings, in that one contained 5% by weight Sandoquad T5M (an additive according to the present invention), one contained 2% by weight Sandolec AMD (an additive not according to the invention) and one contained no additive. It should be noted mentioned that the fact that only 2% by weight of Sandolec AMD was present in the second fibre as opposed to 5% of the additive in the first fibre, is not believed to invalidate the comparison. Other tests have shown that Sandolec AMD is inferior even when used at the same concentration as Sandoquad T5M.

The blowing tests were conducted using 3.5 mm I.D./5.0 mm O.D. carbon lined duct. A semi-tortuous 300 m route was chosen. This was made up of a 500 mm×400 mm rectangular section, for the first and third 100 metres, and a middle 100 metre section wound onto a 750 mm diameter drum.

The pressure, temperature and dewpoint of both the inlet and outlet air was recorded. An initial flow rate of 20 standard litres/minute was used for all the runs. Fibre speed at various set points along the route, total installation time and blow out time were recorded. Fibres were blown one at a time. Single fibre tests were chosen to eliminate interaction between fibres.

The first set of runs was made using a desiccator to produce air with a relative humidity of 1–2%. The second set of runs was performed using a humidifier to produce air of 6.5% relative humidity. Humidities higher than this were not used due to concerns of contaminating the duct and blowing head with water.

In dry conditions there was a very distinct difference between the three coating types. The fibre containing Sandoquad T5M was installed in a time of just under 13 min and blew out in 5 min 12 secs. The installation rate started at over 30 m/min and fell gradually to around 25 m/min at the end of the run.

The fibre containing Sandolec AMD also started at a rate of >30 m/min but this fell to around 5 m/min after the first 100 m and the fibre took nearly an hour to install. Blowout time was 7 min 52 secs.

The fibre with no additive took four attempts to get past 1 m of the duct. Even then the maximum distance achieved was only 21 m in 8 min 30 secs.

When using the humidifier to produce air of 6.5% relative humidity the difference between the AMD and T5M fibres was removed. The T5M sample was installed in a similar time to that under dry conditions, 13 min 13 secs, and blew out slightly more quickly in 4 min 44 secs. The AMD fibre was almost identical to this at 12 min 57 secs and 4 min 53 secs, which represented a significant improvement on the dry result with this additive. The fibre with no additive also showed a significant improvement in moist conditions, managing 178 metres in 32 min 9 secs before coming to rest.

Figure 2:
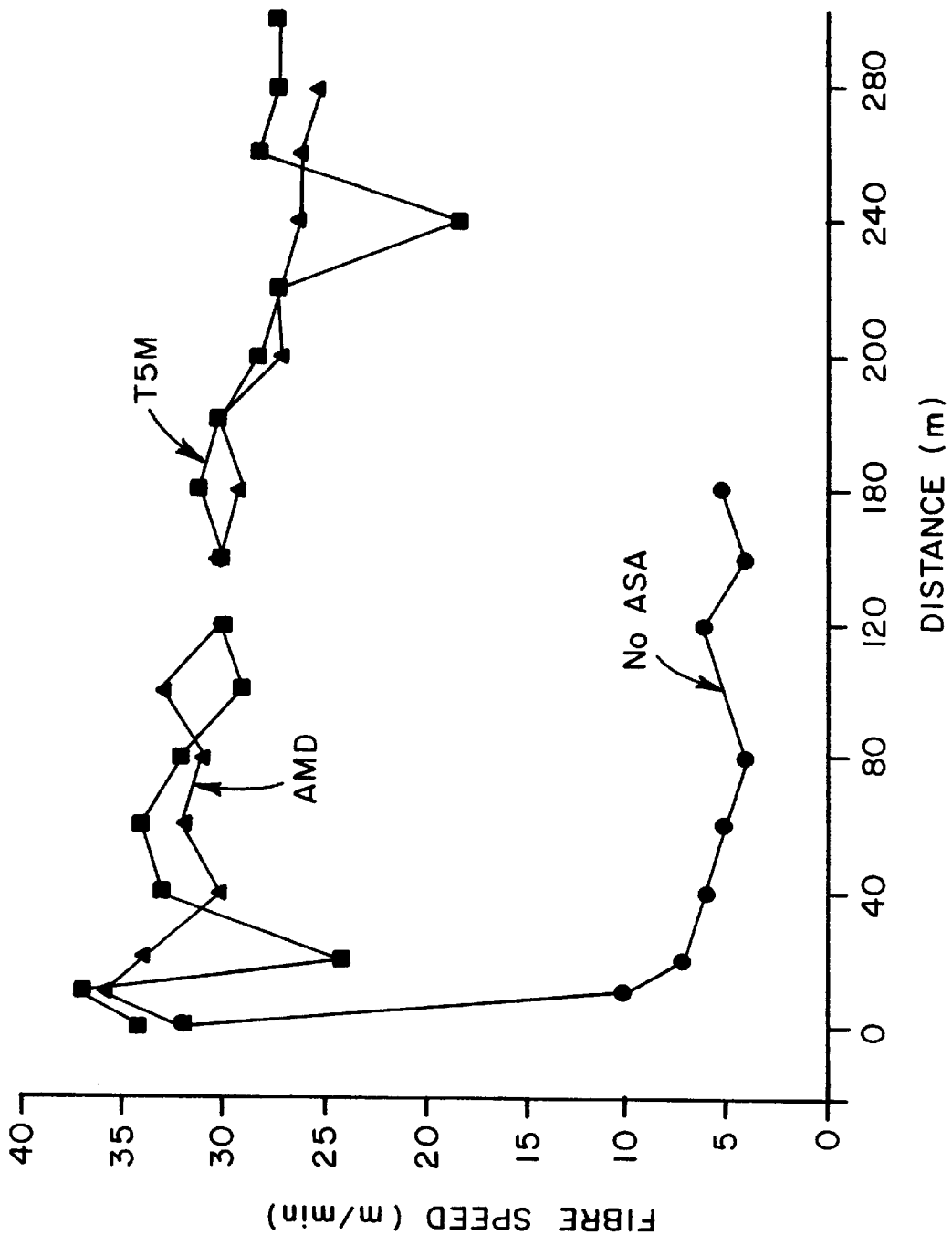

The results of the test are summarised in Table 4 below, and shown graphically in FIGS. 1 and 2.

The results demonstrate the influence of electrostatics on the blowability of acrylate coated fibres. They especially demonstrate the problems caused by blowing with dry compressed air.

The fibre containing Sandoquad T5M performed excellently under both dry and moist conditions. The fibre containing Sandolec AMD performed equally well in moist blowing conditions but poorly at 1–2% RH. Fibre without any additive would not blow at all with dry air and only completed just over half the route using air of 6.5% RH.

It is possible that the fibre without additive would have completed the test if higher humidities had been used but this would be undesirable for reasons discussed above.

TABLE 4

INSTALLATION TIME AND BLOW OUT TIME

| COATING TYPE | 1–2% RH | | 6.5 RH | |
|---|---|---|---|---|
| | Installation | Blow Out | Installation | Blow Out |
| SANDOQUAD T5M | 12 min 51 sec | 5 min 12 sec | 13 min 13 sec | 4 min 44 sec |
| SANDOLEC AMD | 54 min 15 sec | 7 min 52 sec | 12 min 57 sec | 4 min 53 sec |
| No Additive | 21 meters in 8 min 17 sec | — | 178 meters in 32 min 9 sec | — |

We claim:

1. An optical transmission line element exhibiting antistatic behavior, said element comprising a member selected from the group consisting of a duct, said duct having an internal surface and an external surface, and an optical transmission line assembly which comprises at least one optical fiber, said assembly having an external surface, said element further comprising a coating which comprises a non-aqueous, or substantially non-aqueous, antistatic composition comprising (a) at least one antistatic agent, and (b) at least one organic liquid having a dielectric constant of $\geq 15$ and a boiling point of $\geq 100°$ C. selected from the group consisting of liquid polyhydric alcohols, 1,2-propane diol cyclic carbonate, and 1.3-dioxan-2-one.

2. An element according to claim 1, wherein said dielectric constant is $\geq 20$.

3. An element according to claim 2, wherein said dielectric constant is $\geq 25$.

4. An element according to claim 1, wherein said boiling point is $\geq 150°$ C.

5. An element according to claim 1, wherein said antistatic agent is selected from the group consisting of quaternary ammonium compounds, amine compounds, polyglycol compounds, amino-polyglycol ether compounds, fatty alcohol derivatives, and phosphate esters.

6. An element according to claim 1, wherein said organic liquid is selected from the group consisting of ethylene glycol, 1,2- propane diol, 1,3-propane diol, 2,4-pentane diol, 2-methyl-2,4-pentane diol, and glycerol.

7. An element according to claim 1, wherein the antistatic composition comprises a component having a solvent or dispersant action on the antistatic agent.

8. An element according to claim 7, wherein said component is a liquid of high dielectric constant and low boiling point.

9. An element according to claim 8, wherein said component is selected from the group consisting of methanol and ethanol.

10. An element according to claim 1, wherein said antistatic agent is fatty amino polyglycol ether, and said organic liquid is 2-methyl -2,4pentanediol.

11. An element according to claim 1, wherein said antistatic composition comprises from 50 to 99.5% of said antistatic agent and from 0.5 to 50% of said organic liquid, said percentages being percentages by weight based on the total weight of said antistatic composition.

12. An element according to claim 11, wherein said antistatic composition comprises from 90 to 99.5% of said antistatic agent and from 0.5 to 10.0% of said organic liquid.

13. An element according to claim 1, wherein said element comprises an optical fiber assembly comprising at least one optical fiber, said coating being an organic polymer based coating disposed on said external surface of said assembly.

14. An element according to claim 13, wherein said coating is an acrylate-based coating.

15. An element according to claim 13, wherein said coating comprises from 1.5 to 20% antistatic composition based on the total weight of the coating.

16. An element according to claim 15, wherein said coating comprises from 2.0 to 10% antistatic composition based on the total weight of the coating.

17. An element according to claim 1, wherein said element is a duct, and said coating is disposed on said internal surface of said duct.

18. An optical transmission line comprising a duct according to claim 17 having at least one optical fiber assembly therein.

19. An optical transmission line comprising a duct according to claim 17 having therein at least one optical fiber assembly comprising at least one optical fiber, said assembly having an external surface, wherein said assembly has an organic polymer based coating disposed on said external surface, said coating comprising a non-aqueous, or substantially non-aqueous, antistatic composition comprising (a) at least one antistatic agent, and (b) at least one organic liquid having a dielectric constant of $\geq 15$ and a boiling point of $\geq 100°$ C. selected from the group consisting of liquid polyhydric alcohols, 1.2-propane diol cyclic carbonate, and 1.3-dioxan-2-one.

20. An optical transmission line comprising a duct having therein an optical fiber assembly comprising at least one optical fiber, said assembly having an external surface, wherein said assembly has an organic polymer based coating disposed on said external surface, said coating comprising a non-aqueous, or substantially non-aqueous, antistatic composition comprising (a) at least one antistatic agent, and (b) at least one organic liquid having a dielectric constant of $\geq 15$ and a boiling point of $\geq 100°$ C. selected from the group consisting of liquid polyhydric alcohols, 1.2-propane diol cyclic carbonate and 1.3- dioxan-2-one.

* * * * *